US012791164B2

(12) United States Patent
Su et al.

(10) Patent No.: US 12,791,164 B2
(45) Date of Patent: Nov. 10, 2026

(54) ASPHERIC LENS

(71) Applicants: Xiamen ZiXin Semi Tech Co., Ltd, Xiamen (CN); Xiamen Guangpu Electronics, Ltd., Xiamen (CN)

(72) Inventors: Haiding Su, Xiamen (CN); Wenlong Wang, Xiamen (CN); Guobiao Lin, Xiamen (CN); Jian Yang, Xiamen (CN)

(73) Assignees: Xiamen ZiXin Semi Tech Co., Ltd, Xiamen (CN); Xiamen Guangpu Electronics, Ltd., Xiamen (CN)

( * ) Notice: Subject to any disclaimer, the term of this patent is extended or adjusted under 35 U.S.C. 154(b) by 0 days.

(21) Appl. No.: 19/387,896

(22) Filed: Nov. 13, 2025

(65) Prior Publication Data

US 2026/0132909 A1 May 14, 2026

(30) Foreign Application Priority Data

Nov. 14, 2024 (CN) ......................... 202411628778.7
Dec. 19, 2024 (CN) ......................... 202423143539.0

(51) Int. Cl.
*F21V 5/04* (2006.01)

(52) U.S. Cl.
CPC .............. *F21V 5/045* (2013.01); *F21V 5/048* (2013.01)

(58) Field of Classification Search
CPC . G02B 19/0047; G02B 19/0061; F21V 5/046; F21V 5/04; F21V 5/045; F21V 5/00
See application file for complete search history.

(56) References Cited

U.S. PATENT DOCUMENTS

| | | | | |
|---|---|---|---|---|
| 9,157,607 | B2 * | 10/2015 | Wang | F21V 13/04 |
| 2017/0074482 | A1 * | 3/2017 | Lin | F21V 5/04 |
| 2017/0089543 | A1 * | 3/2017 | Yamaguchi | F21V 13/02 |

* cited by examiner

*Primary Examiner* — Anabel Ton
(74) *Attorney, Agent, or Firm* — Cooper Legal Group, LLC

(57) ABSTRACT

An aspheric lens includes a lens body. The lens body includes a mounting surface and a light-emitting surface, and a light inlet cavity is defined in the lens body. A side of the light inlet cavity facing the mounting surface includes an entrance, and a top center of the light inlet cavity includes a protruding tapered structure protruding downward. A top center of the light-emitting surface includes a recessed tapered structure recessed downwardly, and the protruding tapered structure and the recessed tapered structure are coaxially arranged.

8 Claims, 4 Drawing Sheets

ASPHERIC LENS

RELATED APPLICATIONS

This application claims priority to Chinese patent application number 202411628778.7, filed on Nov. 14, 2024, and Chinese patent application number 202423143539.0, filed on Dec. 19, 2024. Chinese patent application number 202411628778.7 and Chinese patent application number 202423143539.0 are incorporated herein by reference.

FIELD OF THE DISCLOSURE

The present disclosure relates to the technical field of optical equipment, in particular to an aspheric lens.

BACKGROUND OF THE DISCLOSURE

Light emitting diode (LED) lights, due to their high brightness, energy efficiency, and lightweight design, are becoming the mainstream lighting choice. LED lighting fixtures include ceiling lights and downlights. Existing ceiling lights and downlights require LED chips and single lenses to achieve a divergent light beam. As people's pursuit of a higher quality of life increases, new requirements are being placed on the design, light uniformity, and light pattern of lighting fixtures. Existing standard lenses are no longer sufficient. Therefore, a new lens structure is needed to meet the needs of lighting in different scenarios.

BRIEF SUMMARY OF THE DISCLOSURE

The technical problem to be solved by the present disclosure is to provide an aspheric lens with a newly designed optical structure.

In order to solve the above technical problems, the present disclosure provides an aspheric lens, comprising a lens body. The lens body comprises a mounting surface and a light-emitting surface, and a light inlet cavity is defined in the lens body. A side of the light inlet cavity facing the mounting surface comprises an entrance, and a top center of the light inlet cavity comprises a protruding tapered structure protruding downward. A top center of the light-emitting surface comprises a recessed tapered structure recessed downward, and the protruding tapered structure and the recessed tapered structure are coaxially arranged.

Further, the lens body has a shape of a solid of revolution.

Further, the mounting surface comprises a recessed lamp bead placement position, and the light inlet cavity is recessed from the recessed lamp bead placement position toward the light-emitting surface.

Further, the mounting surface is a textured surface.

Further, the lens body is made of polycarbonate.

Further, the lens body is made of acrylic.

Further, a light distribution curve produced by the lens body is substantially symmetrical, and a peak beam angle of a C0°/180° section of the lens body is 149°±5°. A peak beam angle of a C90°/270° section of the lens body is 149°±5°, and a shape of the light distribution curve is elongated.

Further, a specific shape of the light inlet cavity is formed by rotating a first light inlet curve 360 degrees around an optical axis, and the first light inlet curve is divided into a first inlet segmented curve, a second inlet segmented curve, and a third inlet segmented curve. Curvatures of the first inlet segmented curve, the second inlet segmented curve, and the third inlet segmented curve are different.

The first inlet segmented curve in the first light inlet curve satisfies the following formula: $y=4.88\times x^3-4.16\times x^2+1.44\times x+4.02$, wherein $0\leq x\leq 0.27$.

The second inlet segmented curve in the first light inlet curve satisfies the following formula: $y=-6.67294\times x^6+34.0426\times x^5-69.1227\times x^4+70.9284\times x^3-39.5812\times x^2+11.1633\times x+2.99042$, wherein $0.27\leq x\leq 1.60$.

The third inlet segmented curve in the first light inlet curve satisfies the following formula: $y=2620.0\times x^3-1.29\times 10^4\times x^2+2.11\times 10^4\times x-1.16\times 10^4$, wherein $1.60\leq x\leq 1.68$.

Further, the light-emitting surface is formed by rotating a first light outlet curve 360° around an optical axis, and the first light outlet curve is divided into a first outlet segmented curve and a second outlet segmented curve. Curvatures of the first outlet segmented curve and the second outlet segmented curve are different.

The first outlet segmented curve of the first light outlet curve satisfies the following formula: $y=0.0673\times x^3-0.452\times x^2+1.01\times x+4.45$, wherein $0\leq x\leq 2.025$.

The second outlet segmented curve of the first light outlet curve satisfies the following formula: $y=-0.0052008\times x^5+0.10178\times x^4-0.78556\times x^3+2.8798\times x^2-5.0964\times x+8.7118$, wherein $2.025<x<6.75$.

From the above description of the present disclosure, it can be seen that compared with the existing techniques, the present disclosure provides the aspheric lens. Light has better uniformity after being emitted through the lens body of the present disclosure, and the light has a better light output angle, which can meet the use requirements of a lamp in different scenarios.

DETAILED DESCRIPTION OF THE EMBODIMENTS

The present disclosure is further described below through specific embodiments.

Figure 1:
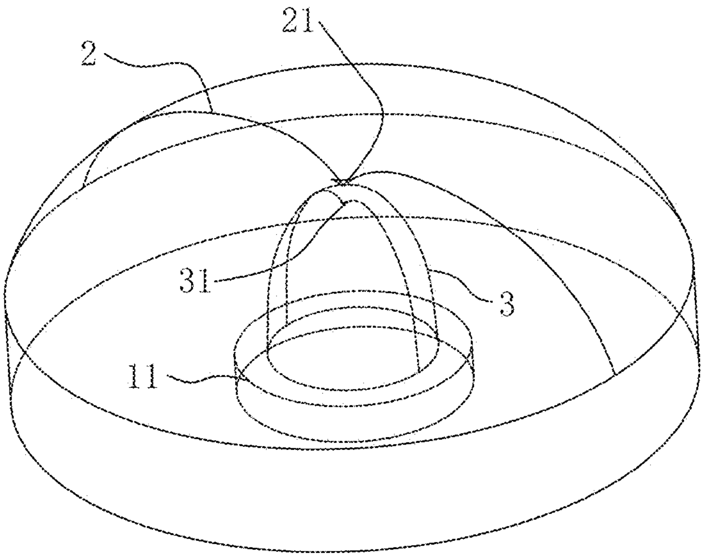
FIG. 1 is a perspective view of an aspheric lens of the present disclosure.
Figure 2:
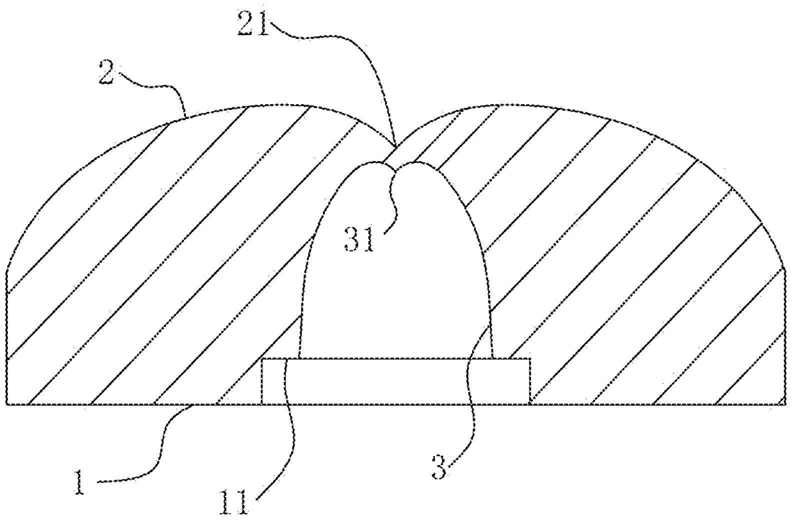
FIG. 2 is a cross-sectional view of the aspheric lens of the present disclosure.

Referring to FIGS. 1 and 2, an aspheric lens comprises a lens body, and the lens body is made of polycarbonate or acrylic. The lens body has a shape of a solid of revolution.

The lens body comprises a mounting surface 1 and a light-emitting surface 2 that are arranged opposite to each other. A light inlet cavity 3 is defined in the lens body. A side of the light inlet cavity 3 facing the mounting surface 1 comprises an entrance. A top center of the light inlet cavity 3 comprises a protruding tapered structure 31 protruding downward. A top center of the light-emitting surface 2 comprises a recessed tapered structure 21 recessed downward. The protruding tapered structure 31 and the recessed tapered structure 21 are coaxially arranged.

The mounting surface 1 comprises a recessed lamp bead placement position 11. The light inlet cavity 3 is recessed from the recessed lamp bead placement position 11 toward the light-emitting surface 2, and the mounting surface 1 is a textured surface.

A light distribution curve produced by the lens body is nearly symmetrical. A peak beam angle of a C0°/180° section of the lens body is 149°±5°, and a peak beam angle of a C90°/270° section of the lens body is 149°±5°. The light distribution curve is narrow and slender.

Figure 3:
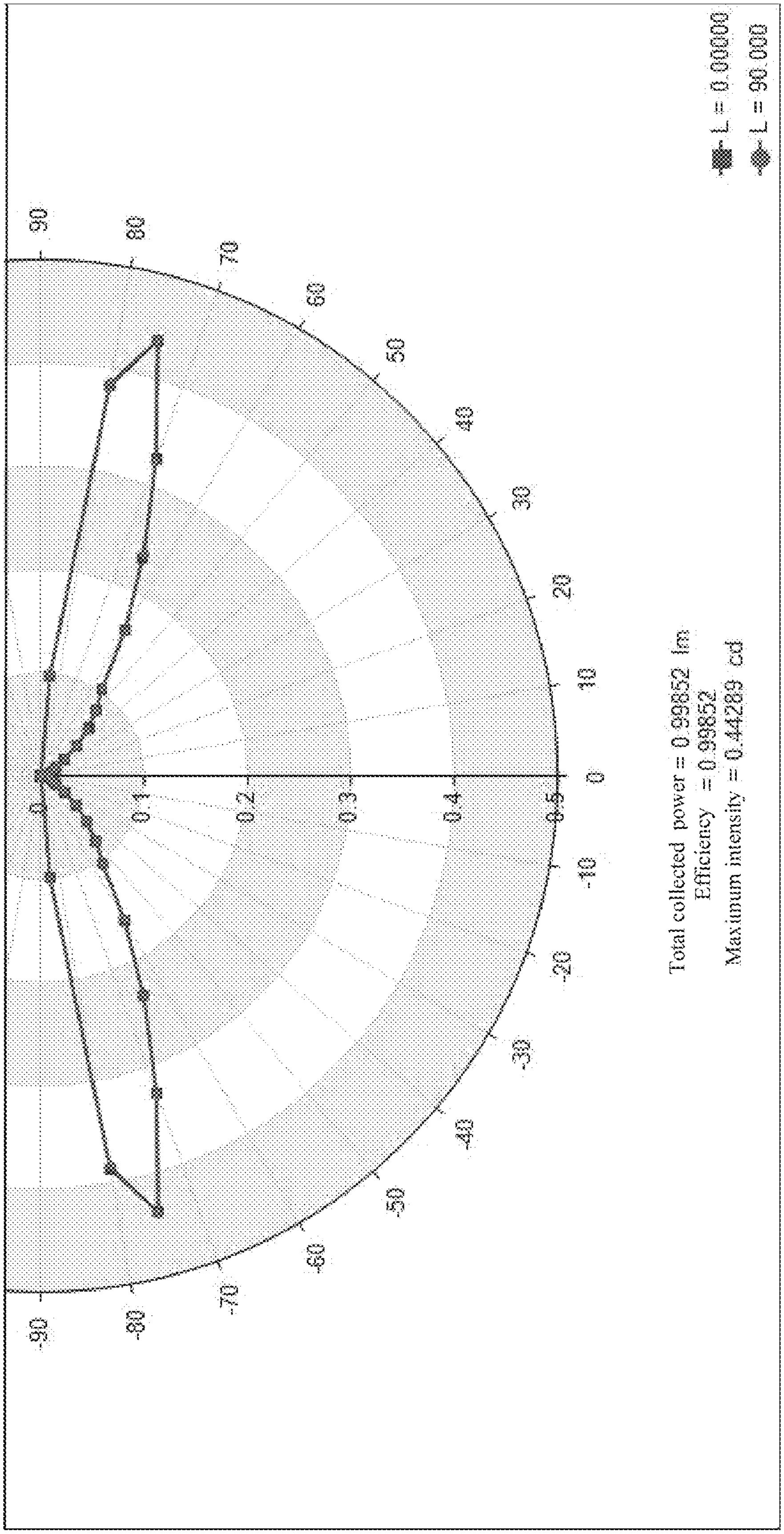
FIG. 3 is a light distribution curve diagram in a polar coordinate system of the present disclosure.
Figure 4:
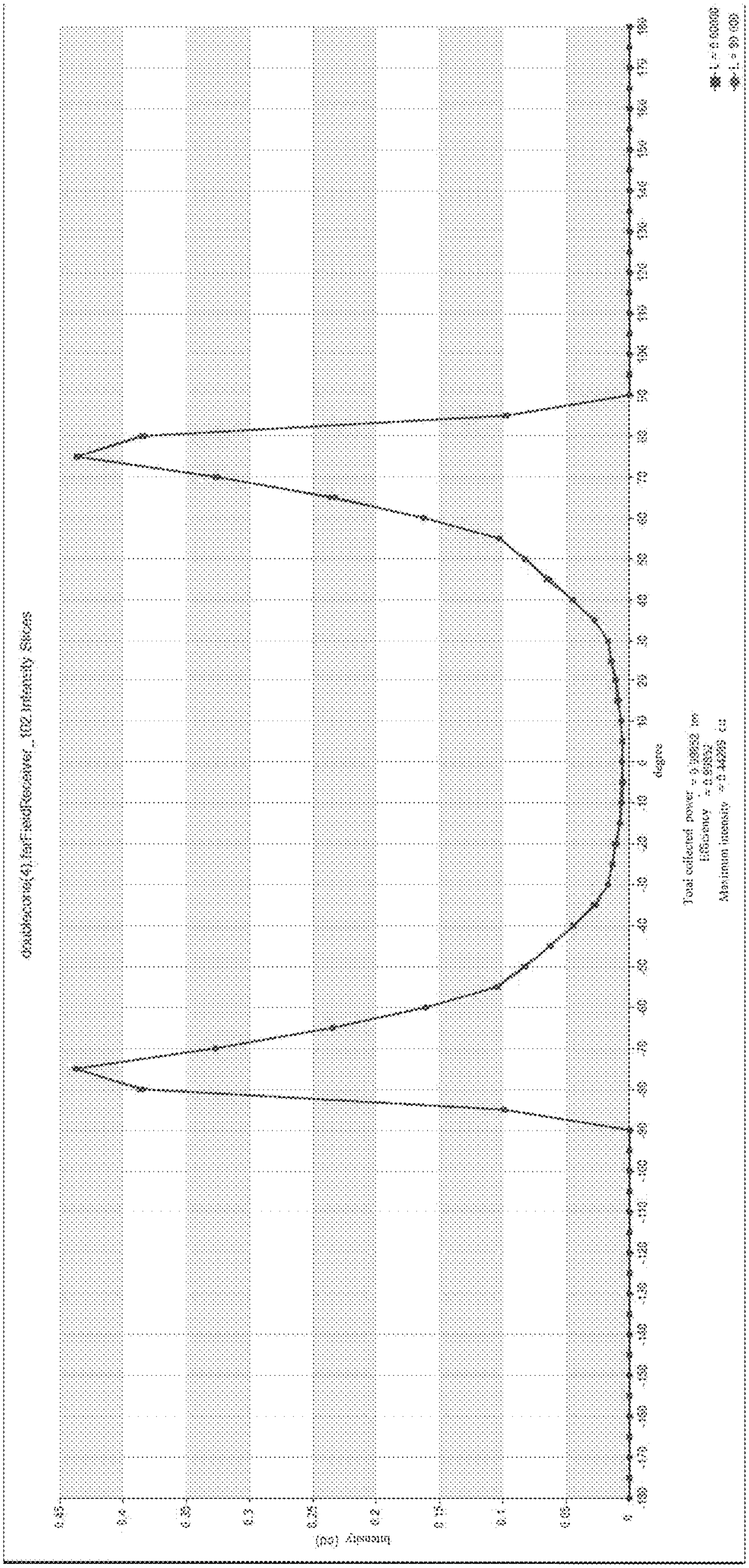
FIG. 4 is a light distribution curve diagram in a rectangular coordinate system of the present disclosure.

FIGS. 3 and 4 are test experiment data diagrams. The optical lens (i.e., the aspheric lens) of the present disclosure is installed on one or more lamp beads (e.g., 2835 or 3030 Surface Mounted Devices (SMD)), and the light distribution curve generated by the one or more lamp beads is shown. FIG. 3 is the light distribution curve in a polar coordinate system. FIG. 4 is the light distribution curve in a rectangular coordinate system, which shows a divergent spatial light intensity distribution. The generated spatial light intensity distribution is nearly symmetrical. The peak beam angles at the C0°/180° and C90°/270° sections are both ±74.5°, and the peak beam angle is about 149°. The light distribution curve is narrow and slender. After being emitted through the aspheric lens of the present disclosure, light has better uniformity and a better light outlet angle, which can meet use requirements of a lamp in different scenarios.

In this embodiment, a specific shape of the light inlet cavity 3 is formed by rotating a first light inlet curve 360 degrees around an optical axis. The first light inlet curve is divided into a first inlet segmented curve, a second inlet segmented curve, and a third inlet segmented curve, and curvatures of the first inlet segmented curve, the second inlet segmented curve, and the third inlet segmented curve are different.

The first inlet segmented curve in the first light inlet curve satisfies the following formula:

$$y=4.88\times x^3-4.16\times x^2+1.44\times x+4.02, \text{ where } 0\le x\le 0.27.$$

The second inlet segmented curve in the first light inlet curve satisfies the following formula:

$$y=-6.67294\times x^6+34.0426\times x^5-69.1227\times x^4+70.9284\times x^3-39.5812\times x^2+11.1633\times x+2.99042, \text{ where } 0.27\le x\le 1.60.$$

The third inlet segmented curve in the first light inlet curve satisfies the following formula:

$$y=2620.0\times x^3-1.29\times 10^4\times x^2+2.11\times 10^4\times x-1.16\times 10^4, \text{ where } 1.60\le x\le 1.68.$$

The light-emitting surface 2 is formed by rotating a first light outlet curve 360° around the optical axis. The first light outlet curve is divided into a first outlet segmented curve and a second outlet segmented curve, and curvatures of the first outlet segmented curve and the second outlet segmented curve are different.

The first outlet segmented curve of the first light outlet curve satisfies the following formula:

$$y=0.0673\times x^3-0.452\times x^2+1.01\times x+4.45, \text{ where } 0\le x\le 2.025.$$

The second outlet segmented curve of the first light outlet curve satisfies the following formula:

where $2.025<x<6.75$.

A lens angle obtained by the first light inlet curve and the first light outlet curve is 140°-165°.

The above is only a specific implementation of the present disclosure, but the design concept of the present disclosure is not limited to this. Any non-substantial changes to the present disclosure using this concept shall be deemed as an infringement of the protection scope of the present disclosure.

What is claimed is:

1. An aspheric lens, comprising:

a lens body, wherein:

the lens body comprises a mounting surface and a light-emitting surface, a light inlet cavity is defined in the lens body, a side of the light inlet cavity facing the mounting surface comprises an entrance, a top center of the light inlet cavity comprises a protruding tapered structure protruding downward, a top center of the light-emitting surface comprises a recessed tapered structure recessed downward, and the protruding tapered structure and the recessed tapered structure are coaxially arranged, wherein:

a specific shape of the light inlet cavity is formed by rotating a first light inlet curve 360 degrees around an optical axis, the first light inlet curve is divided into a first inlet segmented curve, a second inlet segmented curve, and a third inlet segmented curve, curvatures of the first inlet segmented curve, the second inlet segmented curve, and the third inlet segmented curve are different, the first inlet segmented curve in the first light inlet curve satisfies the following formula: $y=4.88\times x^3-4.16\times x^2+1.44\times x+4.02$, where $0\le x\le 0.27$, the second inlet segmented curve in the first light inlet curve satisfies the following formula: $y=-6.67294\times x^6+34.0426\times x^5-69.1227\times x^4+70.9284\times x^3-39.5812\times x^2+11.1633\times x+2.99042$, wherein $0.27\le x\le 1.60$, and the third inlet segmented curve in the first light inlet curve satisfies the following formula: $y=2620.0\times x^3-1.29\times 10^4\times x^2+2.11\times 10^4\times x^2-1.16\times 10^4$, wherein $1.60\le x\le 1.68$.

2. The aspheric lens according to claim 1, wherein:

the lens body has a shape of a solid of revolution.

3. The aspheric lens according to claim 1, wherein:

the mounting surface comprises a recessed lamp bead placement position, and the light inlet cavity is recessed from the recessed lamp bead placement position toward the light-emitting surface.

4. The aspheric lens according to claim 1, wherein:

the mounting surface is a textured surface.

5. The aspheric lens according to claim 1, wherein:

the lens body is made of polycarbonate.

6. The aspheric lens according to claim 1, wherein:

the lens body is made of acrylic.

7. The aspheric lens according to claim 1, wherein:

a light distribution curve produced by the lens body is substantially symmetrical, a peak beam angle of a C0°/180° section of the lens body is 149°±5°, a peak beam angle of a C90°/270° section of the lens body is 149°±5°, and a shape of the light distribution curve is elongated.

8. A aspheric lens, comprising:

a lens body, wherein:

the lens body comprises a mounting surface and a light-emitting surface, a light inlet cavity is defined in the lens body, a side of the light inlet cavity facing the mounting surface comprises an entrance, a top center of the light inlet cavity comprises a protruding tapered structure protruding downward, a top center of the light-emitting surface comprises a recessed tapered structure recessed downward, and the protruding tapered structure and the recessed tapered structure are coaxially arranged, wherein:

the light-emitting surface is formed by rotating a first light outlet curve 360° around an optical axis, the first light outlet curve is divided into a first outlet segmented curve and a second outlet segmented curve, curvatures of the first outlet segmented curve and the second outlet segmented curve are different, the first outlet segmented curve of the first light outlet curve satisfies the following formula: $y=0.0673\times x^3-0.452\times x^2+1.01\times x+4.45$, wherein $0\leq x\leq 2.025$, and the second outlet segmented curve of the first light outlet curve satisfies the following formula: $y=-0.0052008\times x^5+0.10178\times x^4-0.78556\times x^3+2.8798\ \ \times x^2-5.0964\times x+8.7118$, wherein $2.025<x<6.75$.

* * * * *